United States Patent
Williams, Jr.

(10) Patent No.: US 9,581,257 B2
(45) Date of Patent: Feb. 28, 2017

(54) FLUID EVACUATION VALVE WITH BREAK-AWAY GROOVE

(71) Applicant: Clean Planet Mfg. & Labs, Inc., Staunton, VA (US)

(72) Inventor: James C. Williams, Jr., Staunton, VA (US)

(73) Assignee: CLEAN PLANET MFG. & LABS, INC., Staunton, VA (US)

( * ) Notice: Subject to any disclaimer, the term of this patent is extended or adjusted under 35 U.S.C. 154(b) by 109 days.

(21) Appl. No.: 13/901,202

(22) Filed: May 23, 2013

(65) Prior Publication Data

US 2014/0345718 A1    Nov. 27, 2014

(51) Int. Cl.
*F16K 15/04* (2006.01)
*F01M 11/04* (2006.01)

(52) U.S. Cl.
CPC ........... *F16K 15/044* (2013.01); *F01M 11/045* (2013.01); *Y10T 137/7927* (2015.04)

(58) Field of Classification Search
CPC . F16K 15/044; F01M 11/045; Y10T 137/7927
USPC ... 141/65, 382, 383; 137/312–313, 539, 797
See application file for complete search history.

(56) References Cited

U.S. PATENT DOCUMENTS

| | | | |
|---|---|---|---|
| 1,886,098 A | 11/1932 | Hedglon | |
| 2,158,914 A | 5/1939 | Rinehard | |
| 2,249,303 A | 7/1941 | Smith | |
| 2,320,048 A | 5/1943 | Parson | |
| 2,366,073 A | 12/1944 | Vallerie | |
| 2,425,848 A | 8/1947 | Vawter | |
| 2,454,585 A | 11/1948 | Alderman | |
| 2,554,389 A | 5/1951 | Stevens | |
| 2,594,779 A | 4/1952 | Huffman | |
| 2,755,969 A | 7/1956 | Rainero | |
| 3,216,527 A | 11/1965 | Lewis | |
| 3,743,053 A * | 7/1973 | Kuklewicz | 184/1.5 |
| 3,867,999 A | 2/1975 | Cox | |
| 4,095,672 A | 6/1978 | Senese | |
| 4,128,140 A | 12/1978 | Riches | |
| 4,709,722 A * | 12/1987 | Knapp | 137/539 |
| 4,745,894 A | 5/1988 | Laipply et al. | |
| 4,776,430 A * | 10/1988 | Rule | 184/1.5 |
| 4,776,431 A | 10/1988 | Poling | |
| 4,807,674 A | 2/1989 | Sweet | |
| 4,854,277 A | 8/1989 | Kenney | |
| 4,884,660 A | 12/1989 | Bedi | |
| 5,048,578 A | 9/1991 | Dorf et al. | |
| 5,209,198 A | 5/1993 | Bedi | |
| 5,372,219 A | 12/1994 | Peralta | |
| 5,405,247 A * | 4/1995 | Goodman | 417/139 |
| 5,411,115 A * | 5/1995 | Shropshire | 184/1.5 |
| 5,476,154 A | 12/1995 | Sage | |
| 5,667,195 A * | 9/1997 | McCormick | 251/149.6 |
| 5,772,402 A * | 6/1998 | Goodman | 417/118 |

(Continued)

*Primary Examiner* — Nicolas A Arnett
(74) *Attorney, Agent, or Firm* — Norton Rose Fulbright US LLP

(57) ABSTRACT

A device for removing oils, fuels and other fluids from reservoirs is disclosed that works in conjunction with engine-powered devices via a vacuum-actuated valve containing a multi-tiered U-groove. The U-groove allows a disconnection of the valve bolt shaft from the threaded end that fits inside the reservoir, trapping and holding the fluid in the reservoir.

18 Claims, 4 Drawing Sheets

(56) References Cited

U.S. PATENT DOCUMENTS

| | | | | |
|---|---|---|---|---|
| 5,881,769 | A * | 3/1999 | Hopson | 137/614.2 |
| 5,947,156 | A * | 9/1999 | Tomczyk | 137/899 |
| 6,036,446 | A * | 3/2000 | Goodman | 417/54 |
| 6,123,174 | A | 9/2000 | Elkin et al. | |
| 6,126,142 | A * | 10/2000 | Wolf et al. | 251/354 |
| 6,135,136 | A * | 10/2000 | Klamm | 137/205 |
| 6,508,280 | B2 * | 1/2003 | Capstran | 141/98 |
| 6,799,596 | B2 * | 10/2004 | Liebert | 137/68.14 |
| 6,877,531 | B2 * | 4/2005 | Few | 141/65 |
| 6,896,014 | B1 * | 5/2005 | Bedi | 141/65 |
| 7,467,689 | B1 * | 12/2008 | Batten et al. | 184/1.5 |
| 7,575,023 | B2 * | 8/2009 | Fraser | 137/614.04 |
| 2002/0023691 | A1 * | 2/2002 | Capstran | 141/98 |
| 2002/0117210 | A1 * | 8/2002 | Abrams | 137/312 |
| 2003/0150486 | A1 * | 8/2003 | Liebert | 137/68.14 |
| 2007/0068734 | A1 * | 3/2007 | Williams et al. | 184/1.5 |
| 2010/0276008 | A1 * | 11/2010 | Abrams | 137/68.14 |

\* cited by examiner

FLUID EVACUATION VALVE WITH BREAK-AWAY GROOVE

FIELD OF THE DISCLOSURE

The present disclosure relates generally to the field of transportation and industrialized vehicles and apparatus. The present disclosure relates more specifically to spill-free evacuation of fluids held in reservoirs in transportation and industrialized vehicles and apparatus.

BACKGROUND

Conventional techniques for removing oil from oil pans or other fluids from their respective reservoirs rely either: (1) on gravity to drain fluids from reservoirs into waiting receptacles or (2) on pumps or vacuum devices to suction fluids out of reservoirs and deposit them into used fluids receptacles. Dependence on gravity flow requires a technician to unscrew and remove the manufacturer's drain plug and hope that a receptacle is properly positioned to catch the draining fluids. This type of fluid removal leads to inevitable spills, drips, splashes, and overflowing used fluid pans, even despite a technician's best preventive efforts. Compounding the problem is the environmental endangerment that occurs when changing oils and fluids in the work field, where the wind often blows the fluids being drained over the ground and often even into waterways and streams that happen to be near worksites. The end results are environmental endangerment and the technician's exposure to the hydrocarbons and benzenes found in used oil, or other toxic chemicals found in other fluids.

Vacuum and pump style evacuation systems have introduced suction and evacuation hoses to the oil and fluids changing process. While an improvement over the earlier gravity-based process, these devices have yet to present a fail-safe system for preventing environmental threats and damage to engines.

Some conventional solutions to this problem are disclosed in prior U.S. patents described below. U.S. Pat. No. 5,476,154, issued to Gary Sage, Dec. 19, 1995, discloses an oil changing apparatus that relies in part on a modified drain plug connector and includes a valve that remains closed until the suction side of a coupler is plugged in, opening the valve and allowing fluid to flow, and resulting in suction-powered removal of oil from a reservoir and replenishing of fresh oil. U.S. Pat. No. 5,209,198, issued to Ram D. Bedi et al., May, 1993, discloses an oil removal system that relies on a quick-coupler valve that screws into the drain pan. U.S. Pat. No. 3,867,999, issued to Robert G. Cox on Feb. 25, 1975, discloses a pressure operated system for draining oil. U.S. Pat. No. 5,372,219, issued to Eduardo Peralto on Jul. 13, 1993, discloses an internally mounted apparatus for high speed oil changes, with the apparatus including a valve and a reversible pump, coupled between the oil drain opening and a multi-way valve. U.S. Pat. No. 4,095,672, issued to Frank J. Senese on Jun. 20, 1978, discloses a pressure operated oil draining apparatus, which draws oil through a dipstick conduit.

The solutions of these patents do not provide protection and convenience. For example, one drawback with each of the above referenced disclosures is that each requires connecting and disconnecting a hose to a drain plug with each service or oil change. Current fluid evacuation procedures require that the mechanic, or other technician, crawl under the vehicle or apparatus being serviced to access the plug as best he can, place a receptacle in at least close proximity to where the fluid will drain out and into the receptacle, remove the plug, push a button, twist a bolt, or turn a lever or plug in a hose to activate the spring-loaded plunger inside to begin the fluid flow.

None of the currently available procedures for removing used fluids from reservoirs uses an attached evacuation hose or a vacuum-actuated safety check-valve that replaces the factory's drain plug in the reservoir and retains fluid in reservoirs should the valve be severed, sheared, or otherwise broken away. Furthermore, currently available procedures do not eliminate the need for a fluid transport hose to be permanently attached at the reservoir, thus eliminating the need for a technician to crawl under the vehicle or apparatus to attach an evacuation hose.

SUMMARY

In the description below, "vehicle," in its, singular, plural, and possessive forms refers to automobiles, heavy and light duty trucks, pickup trucks, heavy and light duty equipment, fire and rescue apparatus, military equipment, air industry ground support equipment, and marine and pleasure craft vessels.

The terms "oil," "lubricants," "fluids," and "liquids," and the plural form of these terms may be used interchangeably throughout this disclosure to refer to those who would access, use, or benefit from the elements that the present invention provides for changing oil, fuels, or any other fluids.

In one embodiment, a check-valve assembly may be housed in a donut and designed to be permanently or semi-permanently installed and used in place of a manufacturer's drain plug in reservoirs holding lubricants, fuels, or other fluids for an engine, transmission, gear box, differential, fuel reservoirs found in automobiles, trucks, industrial equipment or machines, heavy earth moving equipment, agricultural/farming equipment, or any engine or electric-powered devices or apparatus, or any devices or apparatus using lubricants, fuels or coolants.

In certain embodiments, a vacuum-actuated valve may rest in a closed position in the reservoir until a vacuum is applied at a distal end. An encapsulated seat, a ball used as a fluid sealing device, and a spring may stay in place and hold fluid in a reservoir. An undercut, multi-tiered U-groove, or other groove, may be machined into the valve at the sealing area of the reservoir. The vacuum-actuated feature may allow the valve to hold fluid until the valve is opened, eliminating the threat of spills. The seating device may allow for a uniformed flow of fluid around the ball to allow for greater fluid flow through the valve. The seat that the ball rests against may be narrow in certain embodiments to prevent debris from lodging between the ball and the seat, which would result in the ball being lodged in an open position. The multi-tiered U-groove may form a safety-seal breaking point below the check-valve surface, which may reduce spillage should the drain plug be broken or severed from the engine, transmission, differential, gearbox, tank, or reservoir. The multi-tiered U-groove may allow the donut housing the valve to rock sideways and disconnect the valve shaft from the threaded end that screws into the reservoir, trapping the fluid in the pan. The attached hose may reduce or eliminate the need for the technician to crawl under the vehicle or apparatus to attach the hose for each service or repair job and the reduction of time required to complete a fluid exchange.

In one embodiment, an apparatus may include a check-valve assembly having a ball, a spring, a seat, a first port, and a u-groove. The spring may be configured to seal the ball against the seat when no external force is applied. The spring may also be configured to create an opening between the ball and the seat when an external force is applied.

The foregoing has outlined rather broadly the features and technical advantages of the present invention in order that the detailed description that follows may be better understood. Additional features and advantages will be described hereinafter that form the subject of the claims. It should be appreciated by those skilled in the art that the conception and specific embodiment disclosed may be readily utilized as a basis for modifying or designing other structures for carrying out the same purposes. It should also be realized by those skilled in the art that such equivalent constructions do not depart from the spirit and scope of this disclosure as set forth in the appended claims. The novel features that are believed to be characteristic of this disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

A check-valve assembly as described below may reduce or prevent used oil, fuels, antifreeze, coolants, hydraulic fluids, and other fluids from spilling, splashing or overflowing when drained from their respective reservoirs into waste receptacles. By preventing the draining fluids from escaping an evacuation hose, the environment and human health are protected. In one embodiment, a valve may allow fluids to be removed from their respective reservoirs without spills to endanger the environment. Furthermore, the valve may reduce or eliminate technicians' health endangering exposure to used fluids, such as oil, which are linked to various cancers and leukemia for the technicians. Additionally, the disclosed valve may increase an end-user's productivity time by decreasing the amount of time required to evacuate a reservoir of its fluids.

Figure 1:
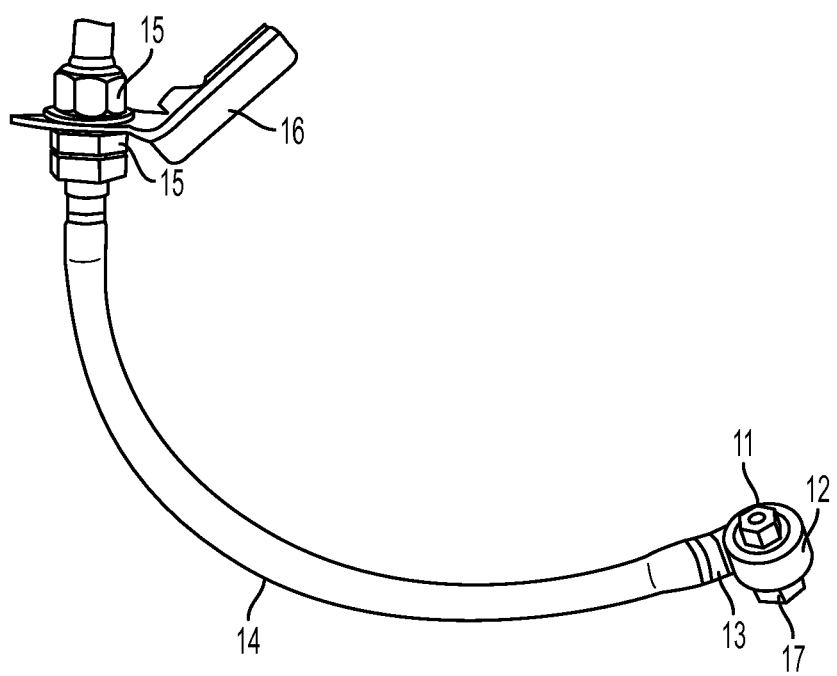
FIG. 1 is a perspective view of a hose assembly according to one embodiment of the disclosure.

FIG. 1 is a perspective view of a hose assembly according to one embodiment of the disclosure. A hose assembly as shown in FIG. 1 may replace an original reservoir drain plug as found in oil and other fluid-containing pans or reservoirs. The assembly may include a valve 11 coupled to a ball (not yet shown), a spring (not yet shown), a seat (not yet shown), an evacuation hose 14, a hose barb 13, a male quick coupler 15, a female quick coupler (not yet shown), washers (not shown), and/or O-rings (not shown). A mounting bracket 16 may hold a distal end of the evacuation hose 14 with the male quick coupler 15 in an easily accessible location on or inside the vehicle, machinery, or apparatus. A donut 12 and a head bolt 17 may be attached to the check-valve 11.

Figure 2:
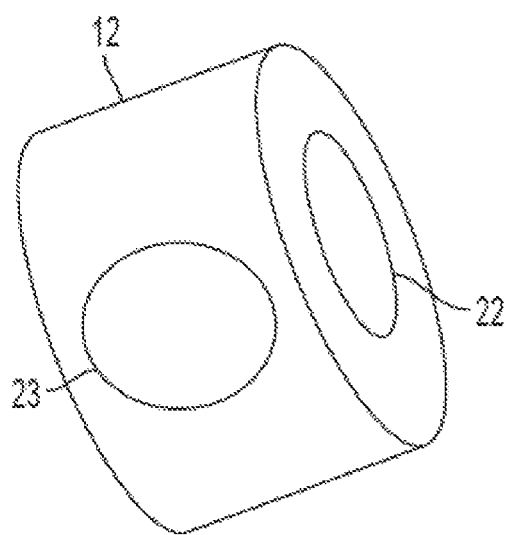
FIG. 2 is an assembled check-valve assembly in a donut according to one embodiment of the disclosure.

FIG. 2 is an assembled check-valve assembly in a donut according to one embodiment of the disclosure. A donut 12 may include a port 23 and a port 22.

Figure 3:
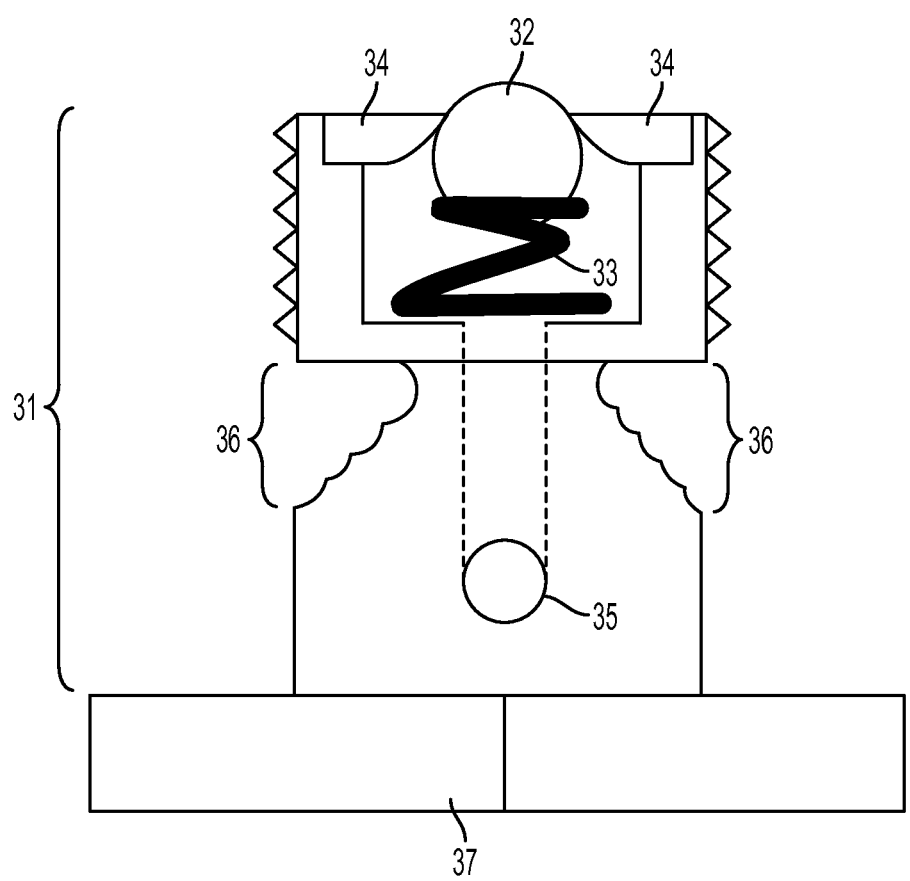
FIG. 3 is a cut-away view illustrating an evacuation valve according to one embodiment of the disclosure.

FIG. 3 is a cut-away view illustrating an evacuation valve according to one embodiment of the disclosure. To accomplish a spill-proof extraction of fluids, the check-valve assembly 31 does not depend on gravity to start the flow from a reservoir. Rather, the check-valve assembly 31 is vacuum-actuated and works in conjunction with an external evacuation device (not yet shown) used to pull the fluid out of the reservoir by creating a vacuum in the check-valve assembly 31. The vacuum pulls against a ball 32, causing a spring 33 to compress, allowing an opening between the ball 32 and the seat 34 and beginning fluid flow from the reservoir through the check-valve assembly 31 and out a port 35 in the check-valve assembly 31. A donut, such as shown in FIG. 2, may align with the port 35, allowing fluid to pass into a fluid transport hose, such as the hose 14 of FIG. 1. A head bolt 37 may secure the check-valve assembly 31 in a donut aligned with the port 35. A multi-tiered U-groove 36 machined into the check-valve assembly 31 may allow for a breakaway action in the event that the bolt is severed. Should the bolt be severed or damaged, the break-away U-groove 36 may reduce or prevent spillage and leakage, because it is placed below the ball 32, which holds the fluid in the reservoir.

Figure 4:
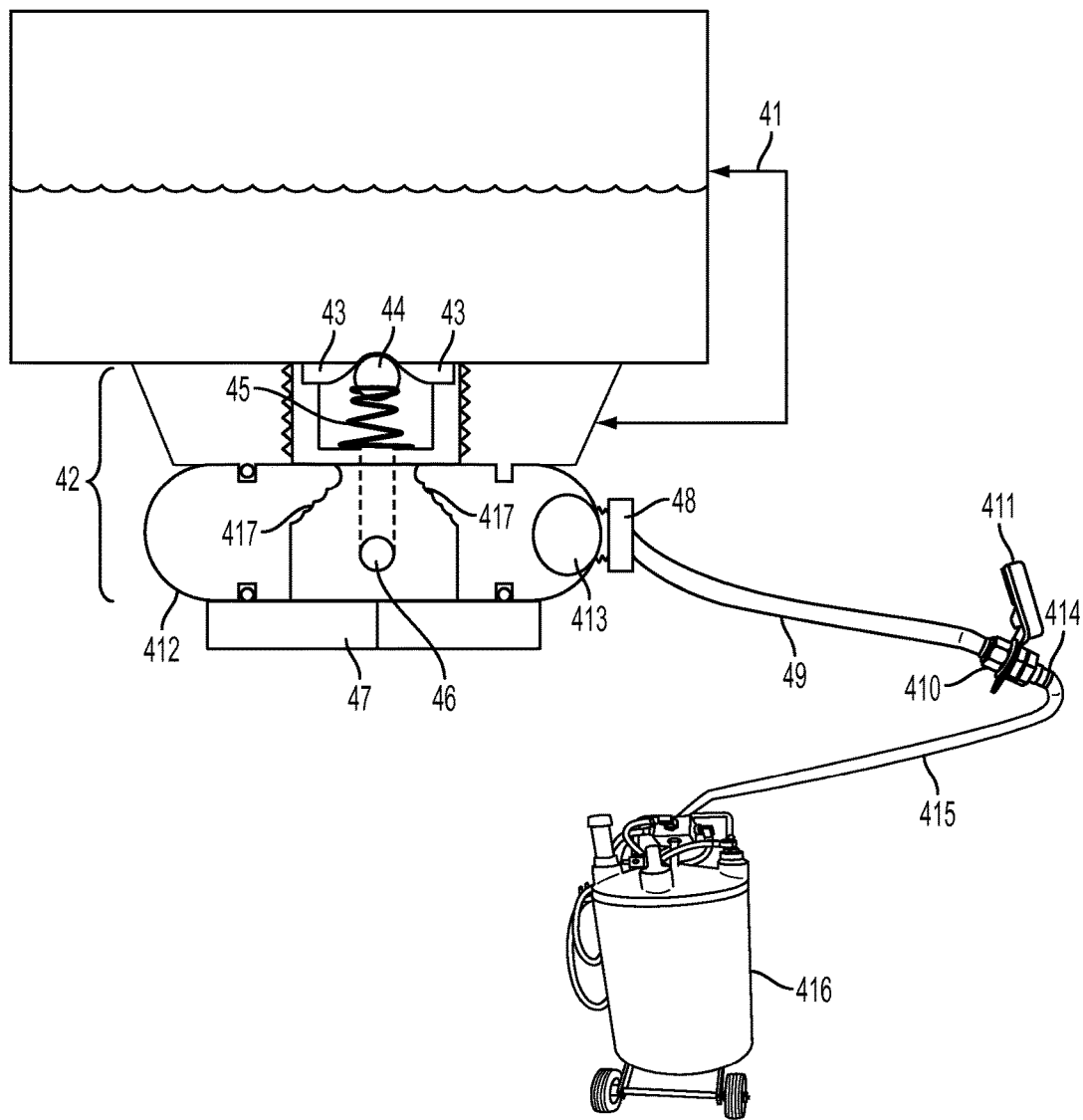
FIG. 4 is a cut-away view illustrating operation of an evacuation valve to drain used fluids into a receptacle according to one embodiment of the disclosure.

FIG. 4 is a cut-away view illustrating operation of an evacuation valve to drain used fluids into a receptacle according to one embodiment of the disclosure. A check-valve assembly 42 may be vacuum-actuated and work in conjunction with an external evacuation device 416 used to pull fluid from a reservoir 41 by creating a vacuum in the check-valve assembly 42. The vacuum pulls against a ball 44, causing a spring 45 to compress, allowing an opening between the ball 44 and the seat 43 and beginning fluid flow from the reservoir 41 through the check-valve assembly 42 and out a port 46 in the check-valve assembly 42. The fluid may continue into a donut 412 having a port 413 that aligns with the valve assembly port 46, allowing fluid to pass into a fluid transport hose 49 connected to a barbed hose fitting 48 at a proximal end and a male quick coupler 410 at the distal end, which is inserted through an opening in a bracket 411. The bracket 411 may be mounted in an easily accessible location on a vehicle or other apparatus. Fluid may flow from the male quick coupler 410 through a female quick coupler 414 attached at a distal end of a fluid transport hose 415, and into a fluid extraction device 416. A head bolt 47 may secure the check-valve assembly 42 in the donut 412. A multi-tiered U groove 417 may be machined into the check-valve assembly 42 and allow for a breakaway action in the event that the bolt is severed. Should the bolt 47 be severed or otherwise damaged, the break-away U-groove 417 may reduce or prevent spillage and leakage.

The valve 42 may vary in thread pitch, diameter, and size for both metric and Society of Automotive Engineers (SAE) standards of measurement, and matched to an opening of the reservoir 41. In certain embodiments, sizes may range from approximately 12 mm×1.75 mm to approximately 50 mm×1.5 mm, and more particularly with sizes ranging from approximately 12 mm×1.75 mm to approximately 27 mm×2.0 mm. The donut 412 housing may range in correlating sizes to accommodate the size of the valve 42.

The multi-tiered U-groove 417 may include a number of tiers being determined by the overall size of the check-valve assembly and the size of the donut needed to accommodate the valve. In one embodiment, the number of tiers may range from at least one to 12, and more particularly between approximately four to six grooves with a depth of each proportional to a diameter of the bolt, and with the top-most point measurement being approximately 13 mm to 19 mm. By allowing the donut 412 movement flexibility when pressure is applied from debris, boulders, or other foreign objects striking it, the U-groove 417 allows a disconnection of the valve bolt shaft from the threaded end that fits inside the reservoir 41, trapping and holding the fluid in the reservoir 41, even if the device is struck directly against the donut 412. In other embodiments, the U-groove 417 may be replaced by a V-groove (not shown) or other groove.

From the safety check-valve assembly to the fluid extraction device, the entire fluid removal process is efficient and spill-proof, making the fluid extraction environmentally superior to the systems of the prior art, increasing productivity by decreasing the time required to remove used fluids from a reservoir, and helping end users remove environmental liability from their balance sheets.

The check-valve assembly 42 and other components may be constructed from a variety of oil- and fuel- resistant materials, including, but not limited to, steel, stainless steel, infused steel, lead, aluminum, brass, bronze, or plastic, or any combination of these materials. The spring 45 may range in size and strength, in accordance to the overall size of the check-valve assembly 42 and the column height of fluid resting in the reservoir 41 above the ball 44. Spring retention on the ball 44 may be determined by how much vacuum is available to move the ball 44 off the seat 43 to allow fluid to flow from the reservoir 41. The spring 45 may be made of a variety of oil- and fuel-resistant materials, such as stainless steel. The seat 43 may also be made of any type of oil- and fuel-resistant material, such as brass Likewise, the ball 44 may be made from any type of oil- and fuel-resistant material, such as steel. Accordingly, the donut 412 may be constructed of a variety of oil- and fuel-resistant materials, including, but not limited to, steel, stainless steel, lead, aluminum, brass, bronze, or plastic, or any combination of these materials. The fluid transport hose 49 may be made of any material ranging from rubber to metal, such as an oil- and fuel-resistant rubber.

Although the present disclosure and its advantages have been described in detail, it should be understood that various changes, substitutions and alterations can be made herein without departing from the spirit and scope of the disclosure as defined by the appended claims. For example, after reading the description, it will be apparent to one skilled in the art of how to implement the disclosed apparatus in alternative embodiments, such as other types of drain plugs. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus, comprising:
a check-valve assembly comprising a flat surface, a plurality of threads located above the flat surface, a ball, a spring, a seat, a first port, and a multi-tiered groove comprising a plurality of tiers located below the flat surface and below the ball,
in which the groove is configured to allow a disconnection of a valve bolt shaft from a threaded end that fits inside a reservoir to hold fluid in the reservoir,
in which the spring is configured to seal the ball against the seat when no vacuum is applied, and
in which the spring is configured to create an opening between the ball and the seat when a vacuum is applied.

2. The apparatus of claim 1, further comprising an external evacuation device configured to generate the vacuum.

3. The apparatus of claim 2, further comprising a reservoir attached to the check-valve assembly such that fluid from the reservoir flows through the check-valve assembly when the vacuum is applied.

4. The apparatus of claim 3, in which the check-valve assembly is configured with a thread pitch, diameter, and size to match an opening on the reservoir.

5. The apparatus of claim 4, in which the check-valve assembly is configured with a size of between approximately 12 mm×1.75 mm to approximately 50 mm×1.5.

6. The apparatus of claim 3, in which the check-valve assembly is configured to be permanently attached to the reservoir.

7. The apparatus of claim 1, further comprising a donut having a second port and a third port.

8. The apparatus of claim 7, further comprising a fluid transport hose coupled to the third port.

9. The apparatus of claim 8, in which the fluid transport hose comprises an oil- and fuel-resistant rubber.

10. The apparatus of claim 8, further comprising: a barbed hose fitting attached to the fluid transport hose at a proximal end; and
a male quick coupler attached to the fluid transport hose at a distal end.

11. The apparatus of claim 10, further comprising a mounting bracket attached at the distal end of the fluid transport hose.

12. The apparatus of claim 10, further comprising an evacuation hose coupled to the male quick coupler.

13. The apparatus of claim 1, in which the groove is configured to form a breaking point.

14. The apparatus of claim 13, in which the groove comprises a U-groove.

15. The apparatus of claim 14, in which the u-groove comprises between approximately four and approximately six tiers.

16. The apparatus of claim 13, in which the groove comprises a V-groove.

17. The apparatus of claim 1, in which the check-valve assembly comprises an oil- and fuel-resistant material.

18. The apparatus of claim 17, in which the check-valve assembly comprises at least one of steel, stainless steel, infused steel, lead, aluminum, brass, bronze, and plastic.

* * * * *